United States Patent
Lulla et al.

(10) Patent No.: US 12,542,653 B2
(45) Date of Patent: Feb. 3, 2026

(54) PROCESSOR-BASED SYSTEM EMPLOYING ENCRYPTED CRYPTOGRAPHIC KEYS TO IMPROVE DATA SECURITY AND RELATED METHODS

(71) Applicant: Microsoft Technology Licensing, LLC, Redmond, WA (US)

(72) Inventors: Jitendra Lulla, Bangalore (IN); Charles Edward Gray, San Francisco, CA (US); Eric Swartzendruber, Austin, TX (US); Fabrice Ferino, Sunnyvale, CA (US); Surendranadh Madineni, Morgan Hill, CA (US); Wael Noureddine, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/755,175

(22) Filed: Jun. 26, 2024

(65) Prior Publication Data
US 2026/0005836 A1    Jan. 1, 2026

(51) Int. Cl.
*H04L 29/06* (2006.01)
*H04L 9/08* (2006.01)

(52) U.S. Cl.
CPC .......... *H04L 9/0822* (2013.01); *H04L 9/0825* (2013.01)

(58) Field of Classification Search
CPC ... H04L 9/0822; H04L 9/0825; H04L 9/0897; H04L 9/14
See application file for complete search history.

(56) References Cited

U.S. PATENT DOCUMENTS

| | | | |
|---|---|---|---|
| 2005/0132226 A1* | 6/2005 | Wheeler | H04L 9/0822 726/4 |
| 2010/0008499 A1* | 1/2010 | Lee | H04L 9/0822 380/46 |
| 2014/0079221 A1* | 3/2014 | McCallum | H04L 9/0822 380/277 |
| 2016/0359622 A1* | 12/2016 | Bunch | H04L 67/1097 |
| 2017/0006001 A1* | 1/2017 | Narayan | H04L 63/0281 |
| 2018/0219675 A1* | 8/2018 | Colgrove | G06F 21/602 |

(Continued)

OTHER PUBLICATIONS

International Search Report and Written Opinion received for PCT Application No. PCT/US2025/019311, mailed on Jun. 23, 2025, 15 pages.

*Primary Examiner* — Yogesh Paliwal

(57) ABSTRACT

Data stored in a memory circuit may be encrypted using client keys that need to be available for high-speed data processing and yet held securely to avoid unauthorized access to the encrypted data. A secure processor circuit in a processor-based system obtains client keys associated with client applications and generates secure key-encryption keys that are used to encrypt the client keys so the client keys can be securely stored in the memory circuit. In some examples, data keys for encrypting data blocks associated with the client application may be generated from the client key, encrypted by a data key-encryption key generated in the secure processor circuit, and stored in the memory circuit. In such examples, because the client keys and data keys are encrypted while in memory, they are safer from software attacks on the memory circuit, which improves the security of the encrypted data blocks.

21 Claims, 7 Drawing Sheets

(56) References Cited

U.S. PATENT DOCUMENTS

| | | | |
|---|---|---|---|
| 2019/0097791 A1* | 3/2019 | Hersans | H04L 9/0894 |
| 2019/0238323 A1* | 8/2019 | Bunch | H04L 9/0825 |
| 2020/0053065 A1* | 2/2020 | Wisniewski | H04L 63/06 |
| 2021/0223968 A1* | 7/2021 | Umesawa | H04L 9/3263 |
| 2022/0045850 A1* | 2/2022 | Ejiri | H04L 9/0643 |
| 2022/0141013 A1* | 5/2022 | Ponnuswamy | H04L 9/0877 713/193 |
| 2025/0004649 A1* | 1/2025 | O'Doherty | H04L 9/0897 |

* cited by examiner

PROCESSOR-BASED SYSTEM EMPLOYING ENCRYPTED CRYPTOGRAPHIC KEYS TO IMPROVE DATA SECURITY AND RELATED METHODS

FIELD OF THE DISCLOSURE

The technology of the disclosure relates, in general, to protecting data in a processor-based system and, more particularly, to avoiding unauthorized software access to keys employed for data encryption.

BACKGROUND

There is an increased focus on protecting confidential data in processor-based systems, from handheld electronic devices to networks and cloud servers, as the methods used to breach security increase in number and complexity. In one method for improving data security, processors may encrypt blocks of data using cryptographic keys before storing the data blocks in an external memory or transferring the data blocks over an external interface. Maintaining the security of encrypted data relies on keeping the keys (e.g., cryptographic keys) used for encryption private. However, a processor may use many cryptographic keys and needs to have them available for quick access in a high-speed data path of a processor while maintaining such privacy. The processor may store the cryptographic keys in a memory in which they are protected by software-controlled security levels. Despite these measures, advanced software attacks can still compromise data security, and unauthorized access to the cryptographic keys can lead to unauthorized access to the encrypted data.

SUMMARY

Exemplary aspects disclosed herein include a processor-based system employing encrypted cryptographic keys to improve data security. Related methods of storing encrypted cryptographic keys are also disclosed. Data processed in a processor-based system may be stored in a memory circuit and arranged in data blocks. To avoid exposure of the data to an attacker that is able to gain unauthorized access to the memory circuit, the data blocks associated with particular client applications may be encrypted using associated client keys (e.g., cryptographic keys). The client keys need to be accessed quickly and frequently for high-speed data processing but should also be held in a secure manner because they can be used to access the encrypted data blocks. In an exemplary aspect, a secure processor circuit in a processor-based system may obtain a client key that is associated with a client application executed in at least one processor circuit, and the secure processor circuit may generate a secure key-encryption key with which it may encrypt the client key so that an encrypted client key may be secure while stored in the memory circuit. In some examples, data keys for encrypting data blocks associated with the client application may be generated from the client key, encrypted by a data key-encryption key generated in the secure processor circuit, and stored in the memory circuit. In such examples, because the client keys and data keys are encrypted while in memory, they are safer from software attacks on the memory circuit, which improves the security of the encrypted data blocks.

In one exemplary aspect, a processor-based system is disclosed. The processor-based system includes at least one processor circuit configured to execute instructions of a first client application, a data encryption and key generation circuit comprising a data key generation circuit, a secure processor circuit, and a secure interface coupling the secure processor circuit to the data encryption and key generation circuit. The secure processor circuit is configured to generate a secure key-encryption key and a data key-encryption key, provide the secure key-encryption key to the data encryption and key generation circuit on the secure interface, obtain a first client key associated with the first client application, encrypt the first client key based on the secure key-encryption key to generate a first encrypted client key, and store the first encrypted client key in a memory accessible to the at least one processor circuit. The data key generation circuit is configured to read the first encrypted client key from the memory, decrypt the first encrypted client key based on the secure key-encryption key to obtain the first client key, generate a first data key based on the first client key, encrypt the first data key based on the data key-encryption key to generate a first encrypted data key, and store the first encrypted data key in the memory.

In another exemplary aspect, a method in a processor-based system is disclosed. The method includes executing, in at least one processor circuit, instructions of a first client application; generating, in a secure processor circuit, a secure key-encryption key and a data key-encryption key; providing, by the secure processor circuit, the secure key-encryption key and the data key-encryption key to a data encryption and key generation circuit on a secure interface; and obtaining a first client key associated with the first client application in the secure processor circuit. The method also includes encrypting, in the secure processor circuit, the first client key based on the secure key-encryption key to generate a first encrypted client key; storing, by the secure processor circuit, the first encrypted client key in a memory; reading, by the data encryption and key generation circuit, the first encrypted client key from the memory; decrypting, by the data encryption and key generation circuit, the first encrypted client key based on the secure key-encryption key to obtain the first client key; encrypting the first data key based on the data key-encryption key to generate a first encrypted data key; and storing the first encrypted data key in a memory accessible to the at least one processor circuit.

In another exemplary aspect, a system is disclosed. The system includes a memory circuit and an integrated circuit (IC). The IC comprises a processor-based system comprising at least one processor circuit configured to execute instructions of a first client application, a data encryption and key generation circuit comprising a data key generation circuit, a secure processor circuit, and a secure interface coupling the secure processor circuit to the data encryption and key generation circuit. The secure processor circuit is configured to generate a secure key-encryption key and a data key-encryption key, provide the secure key-encryption key to the data encryption and key generation circuit on the secure interface, obtain a first client key associated with the first client application, encrypt the first client key based on the secure key-encryption key to generate a first encrypted client key, and store the first encrypted client key in the memory circuit accessible to the at least one processor circuit. The data key generation circuit is configured to read the first encrypted client key from the memory, decrypt the first encrypted client key based on the secure key-encryption key to obtain the first client key, generate a first data key based on the first client key, encrypt the first data key based on the data key-encryption key to generate a first encrypted data key, and store the first encrypted data key in the memory.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 6A:
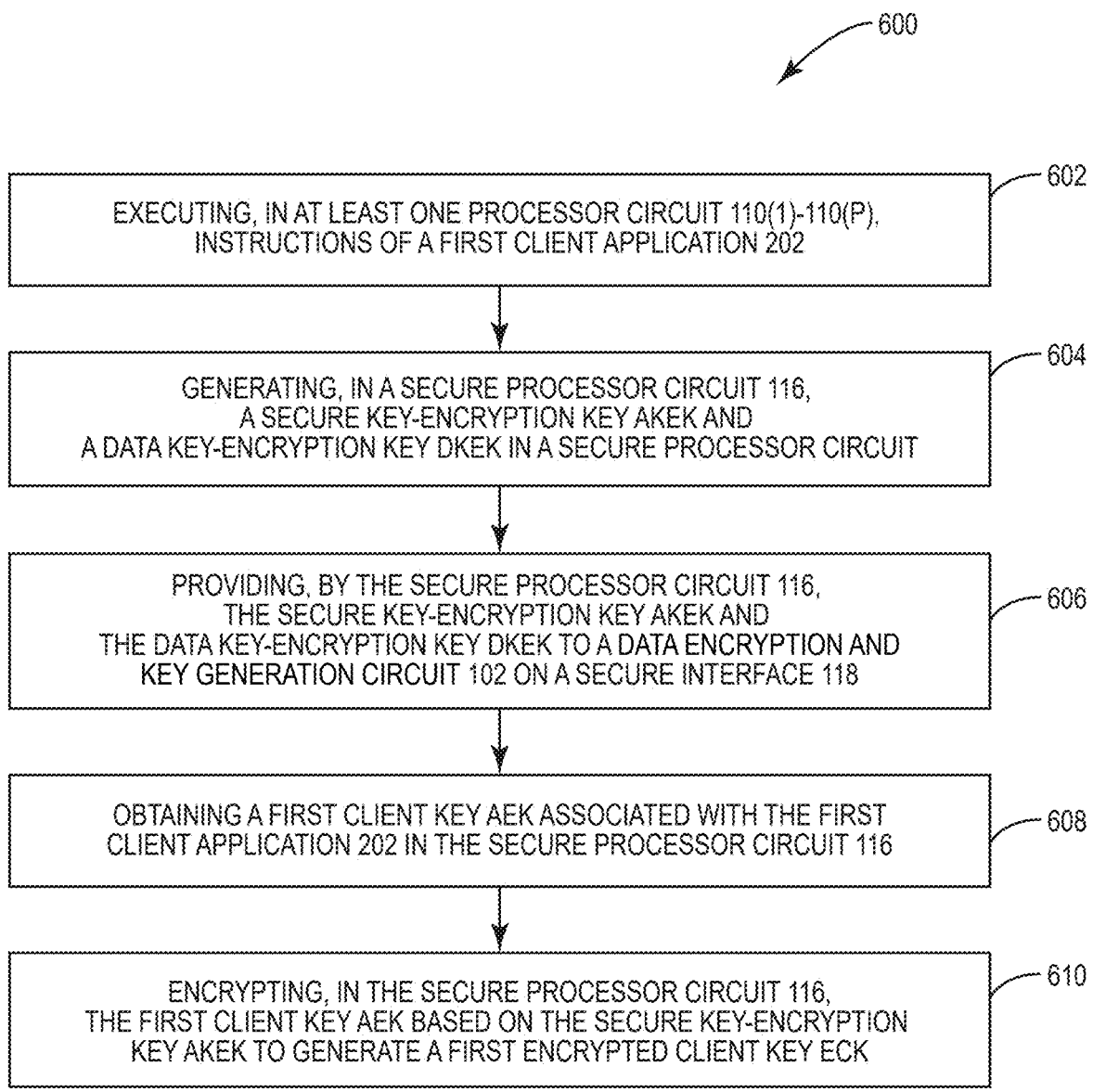
Figure 6B:
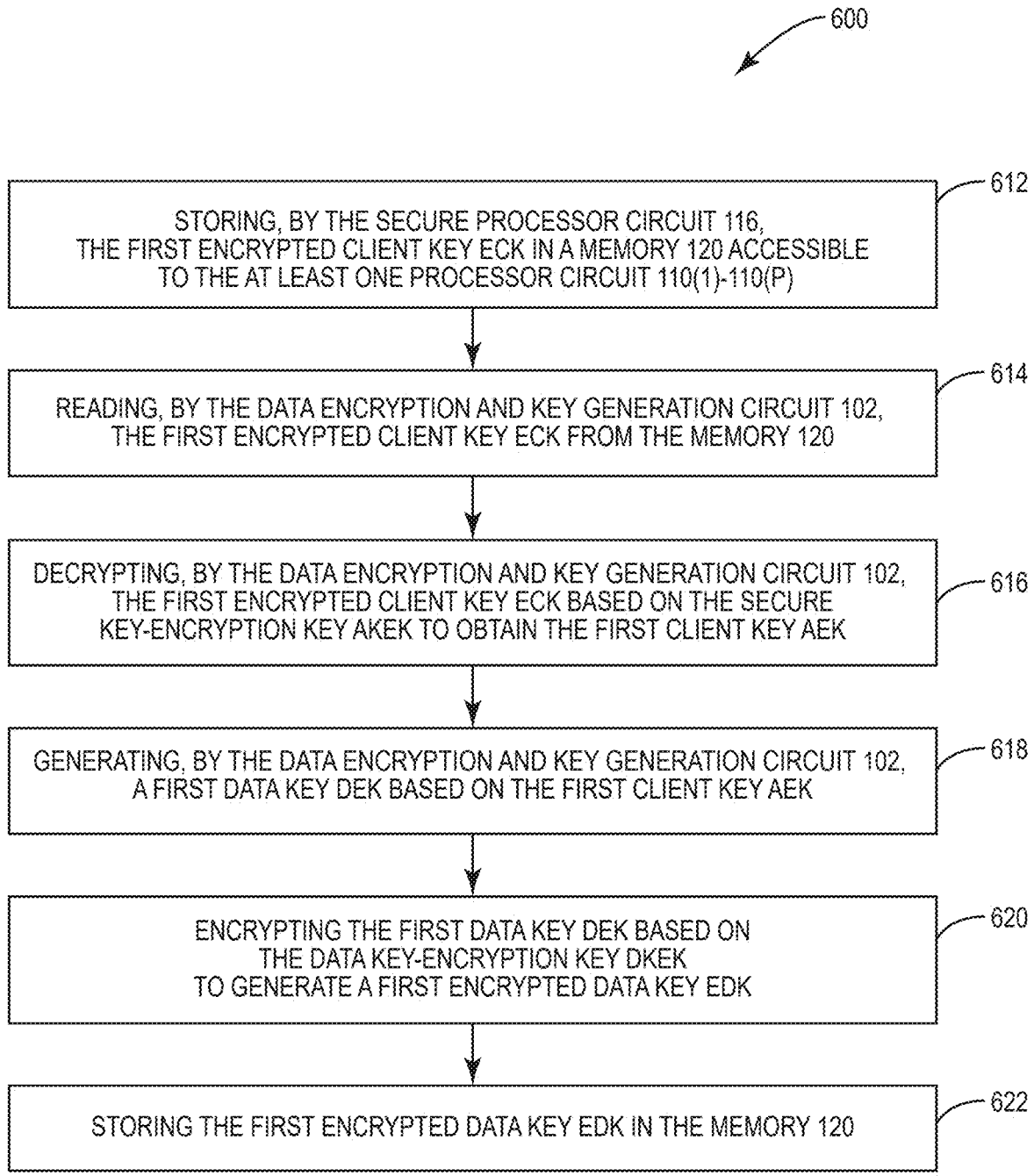
Figure 7:
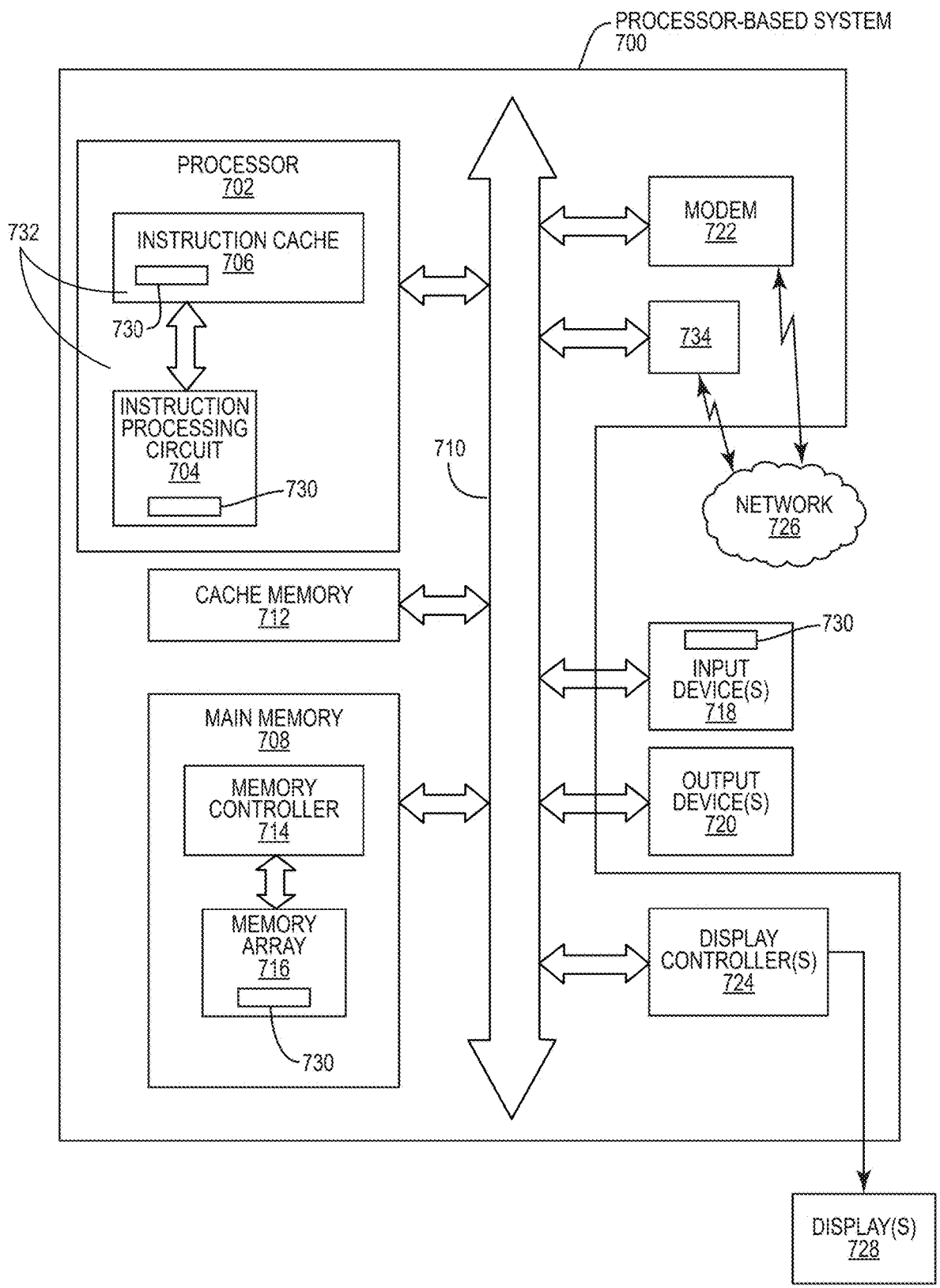

FIGS. 6A and 6B are a flow chart of a method in a processor-based system of encrypting and storing client keys employed for data encryption to improve data security; and FIG. 7 is a block diagram of an exemplary processor-based system that includes a secure processor circuit and a data encryption and key generation circuit that generates, encrypts, and securely stores client keys employed to encrypt data blocks associated with a client application.

DETAILED DESCRIPTION

With reference to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Exemplary aspects disclosed herein include a processor-based system employing encrypted cryptographic keys to improve data security. Related methods of storing encrypted cryptographic keys are also disclosed. Data processed in a processor-based system may be stored in a memory circuit and arranged in data blocks. To avoid exposure of the data to an attacker that is able to gain unauthorized access to the memory circuit, the data blocks associated with particular client applications may be encrypted using associated client keys (e.g., cryptographic keys). The client keys need to be accessed quickly and frequently for high-speed data processing but should also be held in a secure manner because they can be used to access the encrypted data blocks. In an exemplary aspect, a secure processor circuit in a processor-based system may obtain a client key that is associated with a client application executed in at least one processor circuit, and the secure processor circuit may generate a secure key-encryption key with which it may encrypt the client key so that an encrypted client key may be secure while stored in the memory circuit. In some examples, data keys for encrypting data blocks associated with the client application may be generated from the client key, encrypted by a data key-encryption key generated in the secure processor circuit, and stored in the memory circuit. In such examples, because the client keys and data keys are encrypted while in memory, they are safer from software attacks on the memory circuit, which improves the security of the encrypted data blocks.

Figure 1:
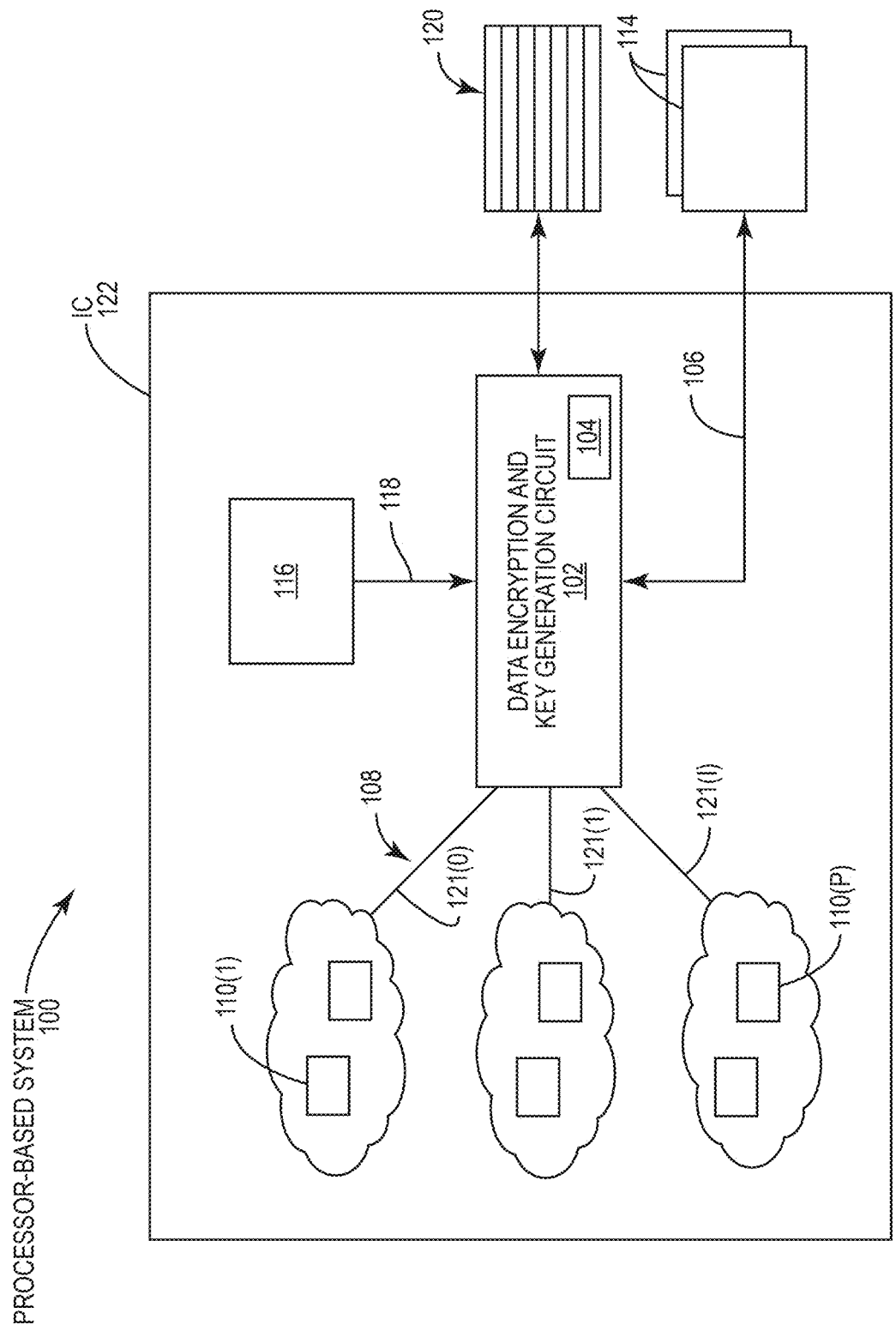
FIG. 1 is a schematic diagram illustrating a processor-based system including a data encryption and key generation circuit configured to provide encryption and decryption of data blocks transferred over an external interface and a secure processor configured to securely handle cryptographic keys used for the encryption and decryption.

FIG. 1 is a schematic diagram illustrating an exemplary processor-based system 100 ("system 100"), including a data encryption and key generation circuit 102 configured to provide encryption and/or decryption ("conversion") of data blocks 104 that are transferred (e.g., transmitted and/or received) over an external interface 106. The term "data block 104" may refer to the data of the data block 104 in encrypted form or plain text form. The data block 104 may be transferred on the external interface 106 in response to instructions 108 received from at least one processing circuit 110(1)-110(P) on internal interfaces 112(1)-112(I). The data encryption and key generation circuit 102 may be coupled to one or more external data storage devices 114, for example. The data encryption and key generation circuit 102 may be a direct memory access (DMA) circuit configured to provide direct memory to memory transfer to and from the external data storage devices 114. The system 100 also includes a secure processor circuit 116 that communicates with the data encryption and key generation circuit 102 on a secure interface 118. The secure processor circuit 116 may provide information securely to the data encryption and key generation circuit 102 on the secure interface 118 and the at least one processing circuit 110(1)-110(P) may not have access to such information (e.g., may not have permission to access information transferred on the secure interface and/or may not have). The secure processor circuit 116 and the data encryption and key generation circuit 102 are configured to securely generate and store cryptographic keys in a memory circuit 120 for frequent access so they may be quickly accessed and used to convert (e.g., encrypt or decrypt using an algorithm or function, for example) the data blocks 104. The DMA transfers of the data encryption and key generation circuit 102 may be between the external data storage devices 114 and the memory circuit 120 or another memory circuit coupled to the processor-based system 100. The processor-based system 100 may be disposed on an integrated circuit 122. The memory circuit 120 may be an on-chip memory circuit disposed internal to the IC 122 or a memory circuit external to the IC 122. Additional details of the conversion of data blocks 104 are provided with reference to FIG. 2.

Figure 2:
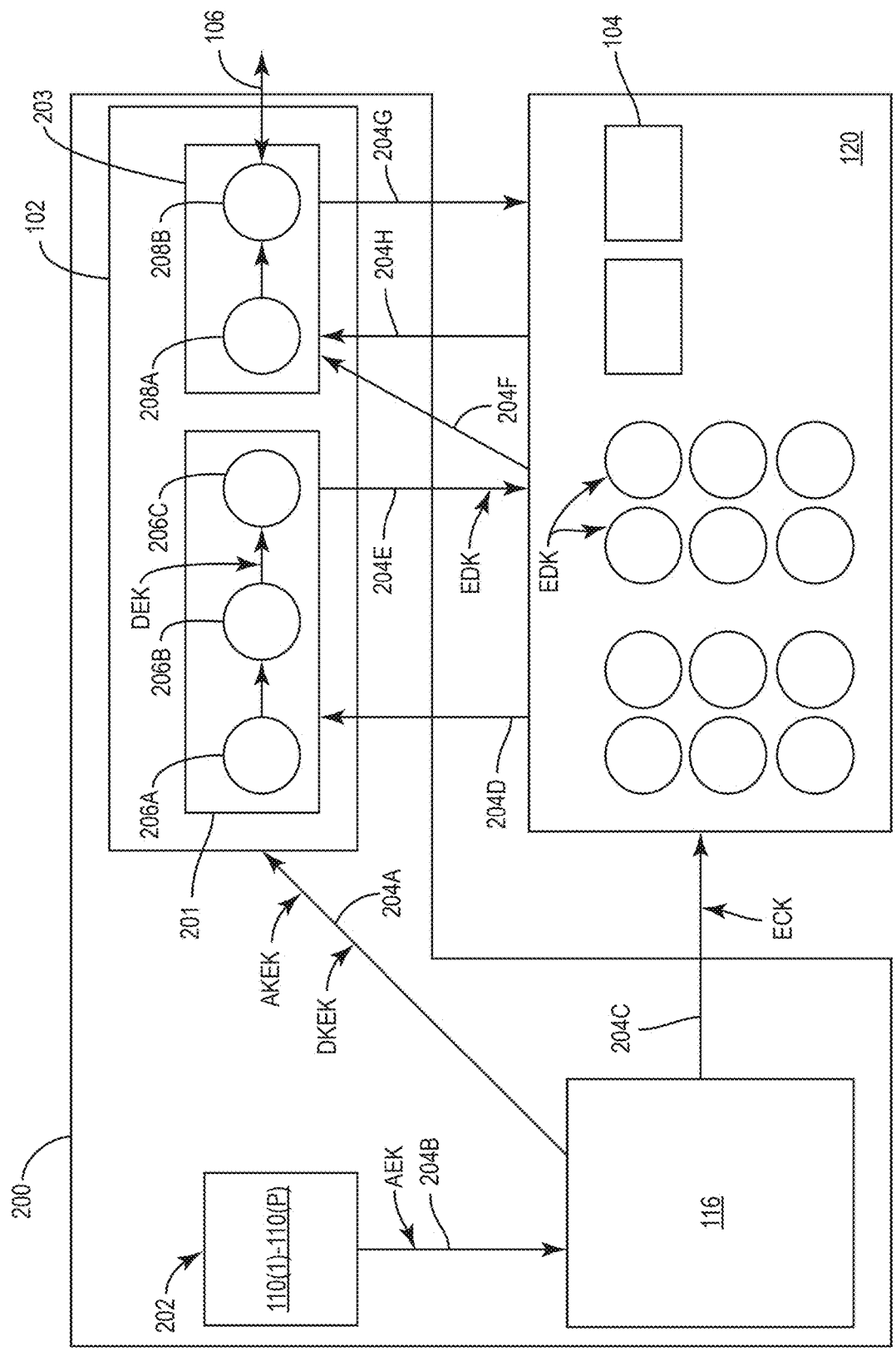
FIG. 2 is a schematic diagram including more details of the elements of the processor-based system shown in FIG. 1 and illustrating transfers of cryptographic keys used for data conversion.

FIG. 2 is a schematic diagram illustrating more details of the elements of a processor-based system 200 that may be the processor-based system 100 shown in FIG. 1. FIG. 2 is also provided to illustrate transfers of cryptographic keys among the secure processor circuit 116, the data encryption and key generation circuit 102, and the memory circuit 120. The cryptographic keys include client keys AEK and data keys DEK used for conversion of the data blocks 104. Features common to both FIG. 1 and FIG. 2 are identified by the same numeric labels.

Before describing the communications in FIG. 2, the conversion of a data block 104 is first explained. Each data block 104 may be encrypted and decrypted using a data key DEK. The data key DEK may be provided for conversion of one of the data blocks 104, and each data block 104 may be converted using one corresponding data key DEK. The data blocks 104 may be associated with a particular client application 202 executing in one of the processing circuits 110(1)-110(P), and the data keys DEK for converting those data blocks 104 may be generated from a client key AEK associated with the client application 202. The data keys DEK may be generated in the data encryption and key generation circuit 102, which includes a data key generation circuit 201 for executing an algorithm or function using the client key AEK as a seed or input. The data encryption and key generation circuit 102 also includes a data encryption circuit 203 that encrypts and decrypts data blocks 104.

With regard to the transfers illustrated in FIG. 2, each time the system 200 boots up, the secure processor circuit 116 generates a secure key-encryption key AKEK and a data key-encryption key DKEK, and provides, in transfer 204A, the secure key-encryption key AKEK and the data key-encryption key DKEK to the data encryption and key generation circuit 102 by way of the secure interface 118 shown in FIG. 1. The secure key-encryption key AKEK and the data key-encryption key DKEK may be stored in secure registers (not shown) and may only be written to those secure registers by way of the secure interface 118, providing no opportunity for access or manipulation by the operating system or application software. As noted above, the data keys DEK are generated in the data encryption and key generation circuit 102 based on the client key AEK, which the client application 202 provides, in transfer 204B, to the secure processor circuit 116. The secure processor circuit 116 then encrypts the client key AEK based on the secure key-encryption key AKEK to generate an encrypted client key ECK. In transfer 204C, the secure processor circuit 116 stores the encrypted client key ECK in the memory circuit 120, where the client key AEK can be stored securely because it is stored in encrypted form. The secure processor circuit 116 may also generate an initialization vector (IV) (not shown), and store the IV with the encrypted client key ECK in the transfer 204C to the memory circuit 120.

To generate the data keys DEK, the data encryption and key generation circuit 102 reads, in transfer 204D, the encrypted client key ECK from the memory circuit 120 and decrypts 206A the encrypted client key ECK based on the secure key-encryption key AKEK, which was previously received from the secure processor circuit 116, to obtain the client key AEK. The data keys DEK may be generated 206B and encrypted 206C before being stored, in transfer 204E, in the memory circuit 120 prior to being needed for converting a data block 104. The initialization vector IV stored with the encrypted client key ECK may be employed in the data encryption and key generation circuit 102 together with the data key-encrypt key DKEK to encrypt the data keys DEK. If the data keys DEK were to be stored in the memory circuit 120 as plain text, they would be vulnerable to unauthorized memory accesses, which, in turn, would make the data blocks 104 stored in the memory circuit 120 vulnerable. To ensure that the data keys DEK remain secure in the memory circuit 120, the data keys DEK are encrypted 206C based on the data key-encryption key DKEK received from the secure processor circuit 116 to obtain an encrypted data key EDK, which is stored in the memory circuit 120.

When a particular data key DEK is needed to convert a data block 104 that is to be transmitted or has been received on the external interface 106, the encrypted data key EDK of the data key DEK corresponding to the data block 104 is read, in transfer 204F, from the memory circuit 120 to the data encryption and key generation circuit 102. The data encryption and key generation circuit 102 is configured to decrypt 208A the encrypted data key EDK to obtain the data key DEK, and then convert 208B to the data block 104 based on the data key DEK to generate a converted data block 104. Whether the conversion 208B is a decryption or an encryption, the converted data block 104 may be stored, in transfer 204G, in the memory circuit 120. The data blocks 104 transferred over the external interface 106 may be stored in encrypted or plain text form in the memory circuit 120 but are encrypted when transferred on the external interface 106. In some examples, an encrypted data block 104 that is to be decrypted may also be read, in transfer 204H, from the memory circuit 120. If the conversion 208B is an encryption, the encrypted data block 104 may be transferred on the external interface 106, for example, or transferred (transfer not shown) to the memory circuit 120. Although the transfer 204A, above, is made by way of the secure interface 118, the remaining transfers 204B-204H are made on, over, or by way of a system interface (not shown) accessible to an operating system executing in the system 200.

Figure 3:
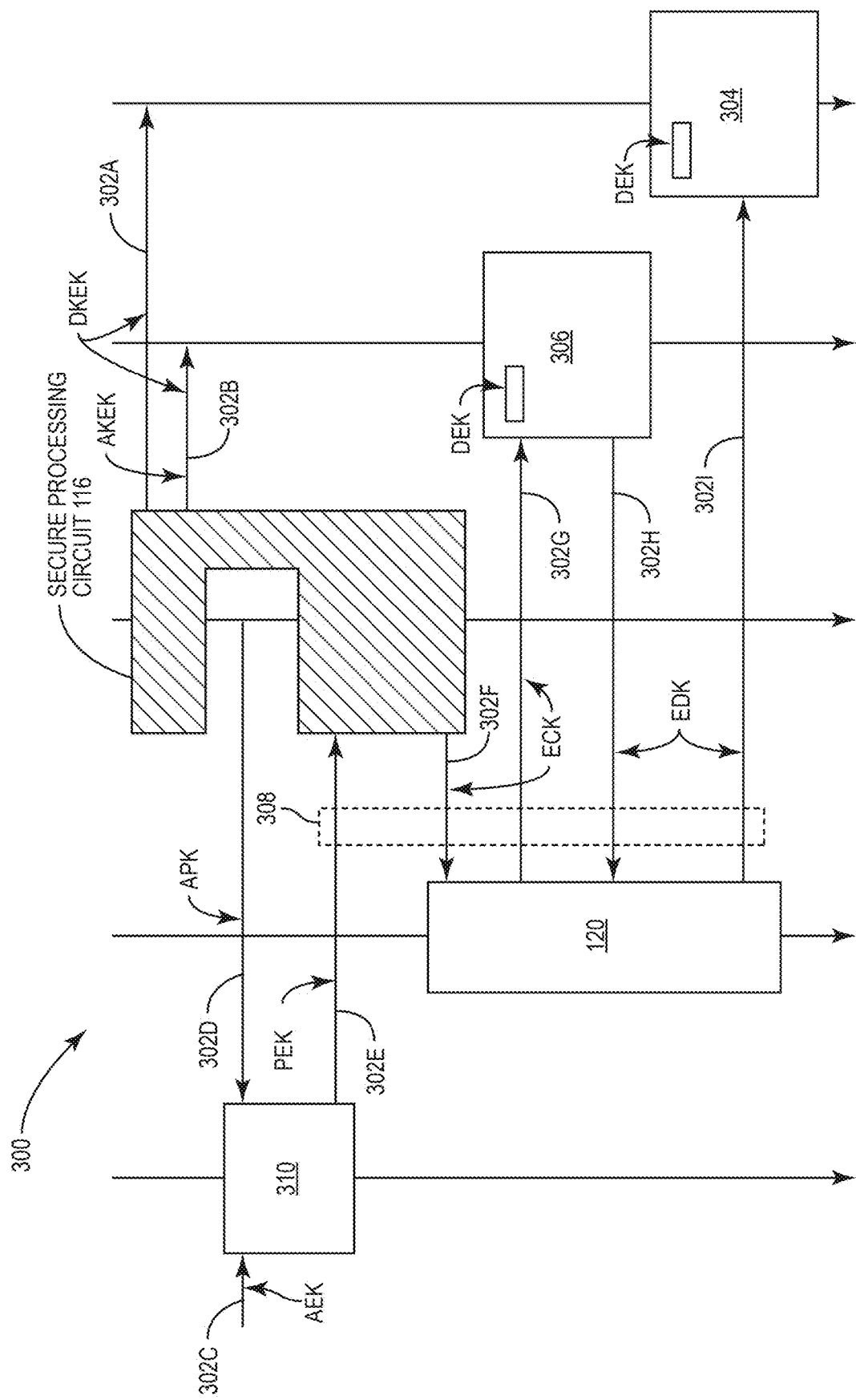
FIG. 3 is a flow chart illustrating a chronology of transfers, among system elements, of the cryptographic keys employed for data security.

FIG. 3 is a flow chart 300 illustrating a chronology of transfers 302A-302I, among system elements, of cryptographic keys in an encrypted form to improve data security in the processor-based system 100 in FIG. 1. The system elements in FIG. 3 that correspond to elements of the system 100 in FIG. 1 have the same labels. Thus, the following description also makes reference to FIG. 1. The progression of time is indicated in the forward progression from top to bottom in FIG. 3, beginning in response to a boot-up of the system 100. The secure processor circuit 116 generates the secure key-encryption key AKEK and the data key-encryption key DKEK and transfers the data key-encryption key DKEK, in transfer 302A, to a data encryption circuit 304 that is included in the data encryption and key generation circuit 102 in FIG. 1. The transfer 302A is over the secure interface 118 in FIG. 1. The secure processor circuit 116 also transfers, in transfer 302B, both the secure key-encryption key AKEK and the data key-encryption key DKEK to a data key generation circuit 306 that is included in the data encryption and key generation circuit 102. The transfer 302B is also made on the secure interface 118 but the remaining transfers 302C-302I in FIG. 3 are made on, over, or by way of a system interface 308 coupled to each of the memory circuit 120, the secure processor circuit 116, and the data encryption and key generation circuit 102.

The data blocks 104 transferred on the external interface 106 may contain data processed in a client application 310, which may be the client application 202 in FIG. 2. The client receives, in transfer 302C, a client key AEK, that is specific to that client application 310. The client key AEK may also be associated with other applications of a client associated with the client application 310. Transferring the client key AEK to the secure processor circuit 116, as shown in transfer 204B in FIG. 2, as plain text on the system interface 308 would increase the risk of exposure of the client key AEK. To address this concern, the secure processor circuit 116 generates an authenticated public key APK, which may be provided, in transfer 302D, to the client application 310, and the client application 310 encrypts the client key AEK to generate a first client key, the public encrypted client key PEK. The public encrypted client key PEK is provided, in transfer 302E, to the secure processor circuit 116. The transfer 302E from the client application 310 may actually be implemented as a transfer to the secure processor circuit 116 from the memory circuit 120 or a register provided for such purpose.

The remaining transfers 302F-302I in FIG. 3 correspond to the transfers 204C-204F in FIG. 2. The secure processor circuit 116 uses the authenticated public key APK to decrypt the public encrypted client key PEK. The secure processor 116 then re-encrypts the client key AEK based on the secure key-encryption key AKEK to generate a second encrypted client key, the encrypted client key ECK. In transfer 302F, the secure processor circuit 116 stores, the encrypted client key ECK in the memory circuit 120.

The data encryption and key generation circuit 102, and more specifically, the data key generation circuit 306, reads the encrypted client key ECK from the memory circuit 120 in transfer 302G. The data key generation circuit 306 decrypts the encrypted client key ECK based on the secure key-encryption key AKEK to obtain the client key AEK and generates the data keys DEK for accessing the data blocks 104 of the client application based on the client key AEK. The data key generation circuit 306 encrypts the data keys DEK based on the data key-encryption key DKEK to obtain an encrypted data key EDK, which is stored in the memory circuit 120 in transfer 302H. When a particular data key DEK is needed, to convert a data block the encrypted data key EDK for the data key DEK corresponding to the data block 104 is read, in transfer 302I, from the memory circuit 120 to the data encryption and key generation circuit 102.

In the transfers 302A-302I in the flow chart 300, the client key AEK and the data keys DEK are stored in the memory circuit 120 in encrypted form and are only available in plain text form within the secure processor circuit 116 and the data encryption and key generation circuit 102, where they cannot be accessed by software. The encrypted client key ACK and the encrypted data key EDK cannot be decrypted to access the client key AEK and the data keys DEK without the secure key-encryption key AKEK and the data key-encryption key DKEK, respectively. But the secure key-encryption key AKEK and the data key-encryption key DKEK are not stored in the memory circuit 120 and are only available to the secure hardware circuits, including the secure processor circuit 116 and the data encryption and key generation circuit 102. Thus, according to the flow chart 300, security of the data blocks 104 is improved.

Figure 4:
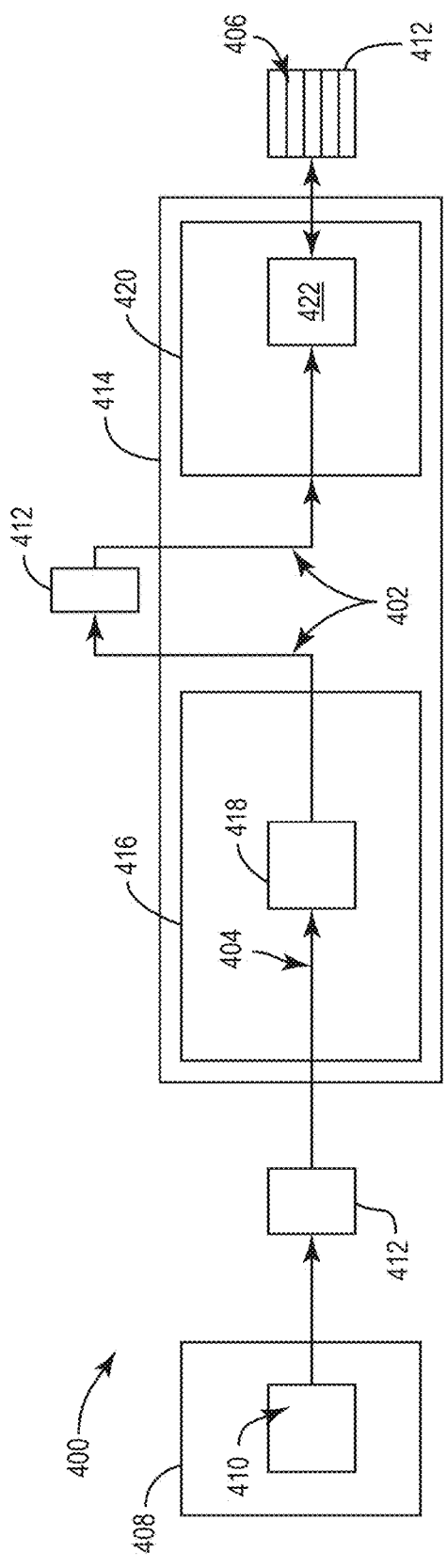
FIG. 4 is a schematic diagram illustrating a conventional processor-based system obtaining and generating the keys used for encryption of data blocks for a client application.
Figure 5:
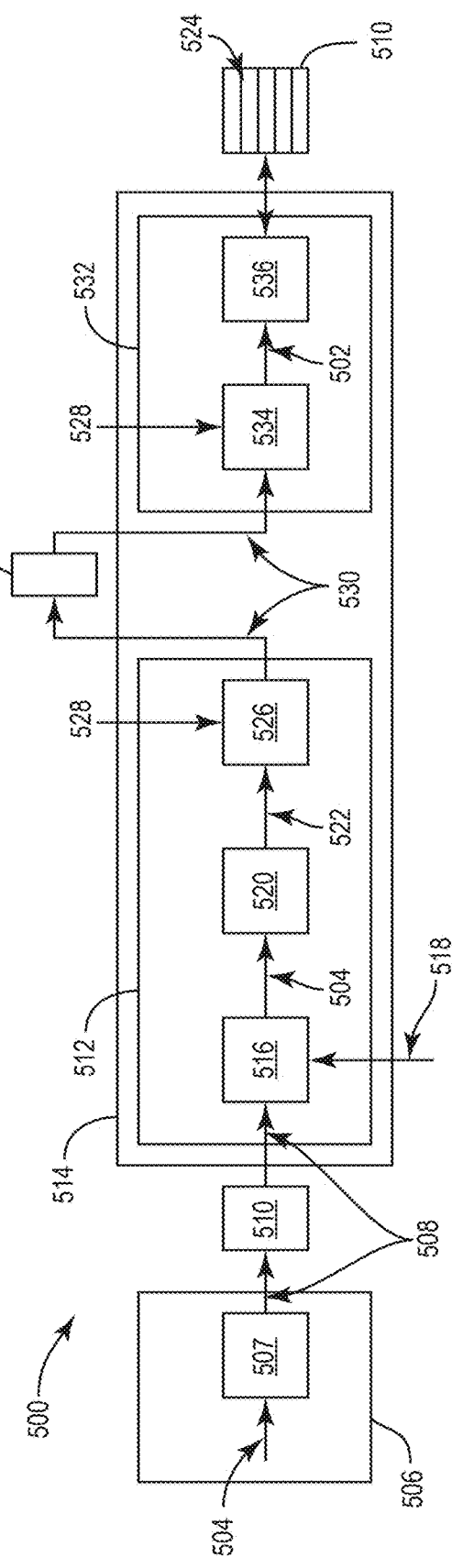
FIG. 5 is a schematic diagram illustrating the exemplary processor-based system according to FIGS. 1-3, which encrypts keys used for data encryption for secure storage in a memory circuit.

FIG. 4 is a block diagram of a conventional system 400 generating data keys 402 based on client keys 404 stored in plain text form to encrypt data blocks 406 associated with a client application. FIG. 4 is provided for comparison to an exemplary system 500 in FIG. 5, generating data keys 502 based on client keys 504 that are only stored in encrypted form, as shown in FIGS. 1-3.

The system 400 includes a secure processor circuit 408 that stores a client key 410 in plain text form in a memory 412, where it may be accessed by a data encryption and key generation circuit 414. A data key generation circuit 416 in the data encryption and key generation circuit 414 includes a key derivation function 418 that generates data keys 402 from the client key 404 and stores the data keys 402 in the memory 412 in plain text form. A data encryption circuit 420 in the data encryption and key generation circuit 414 reads the data keys 402 from the memory 412 and provides the data keys 402 to a cryptographic circuit 422 that encrypts/decrypts data blocks 406, which may then be stored in the memory 412. In the system 400, the client key 404 and the data keys 402 stored in the memory 412 in unencrypted or plain text form are vulnerable to software attacks on the memory 412, which also puts the data blocks 406 at risk of unauthorized access.

The system 500 includes a secure processor circuit 506 that receives a client key 504 and employs an encryption circuit 507 for encrypting the client key 504 to generate an encrypted client key 508 that is stored in a memory circuit 510. A data key generation circuit 512 in a data encryption and key generation circuit 514 reads the encrypted client key 508 from the memory circuit 510 and employs a decryption circuit 516 to decrypt the encrypted client key 508 using a secure key-encryption key 518, that was previously provided to the data key generation circuit 512 from the secure processor circuit 502 in a secure manner. The encrypted client key 508 is decrypted to obtain the client key 504. A key derivation function (KDF) 520 in the data key generation circuit 512 uses the client key 504 as an input or seed to generate the data keys 502. The data keys 502 are used for converting data blocks 524 associated with a client application corresponding to the client key 504. The data key generation circuit 512 includes a key encryption circuit 526 to encrypt the data keys 502 based on a data key-encryption key 528 to generate encrypted data keys 530, which are stored in the memory circuit 510. A data encryption circuit 532 in the data encryption and key generation circuit 514 reads the encrypted data keys 530 from the memory circuit 510, employs a decryption circuit 534 to decrypt the encrypted data keys using the data key-encryption key 528, and employs a cryptographic circuit 536 to convert the data blocks 524 based on the data keys 502 to generate a converted data block 524. In this regard, a "converted data block" may be in plain text form or encrypted form depending on whether the conversion is encryption or decryption. Encrypted or decrypted data blocks 524 may be stored in the memory circuit 510. The data blocks 524 remain secure because the client key 504, the data keys 502, the secure key-encryption key 518, and the data key-encryption key 528 are held in hardware and not stored in the memory circuit 510. The secure key-encryption key 518 and the data key-encryption key 528 are generated in the secure processor circuit 502 and are securely provided to the data encryption and key generation circuit 514.

In response to the need for converting a second data block 524, the KDF 520 in the data key generation circuit 512 generates a second data key 502 based on uses the client key 504. The second data key is used for converting the second data block 524 associated with the client application corresponding to the client key 504. The data key encryption circuit 526 encrypts the second data key 502 based on the data key-encryption key 528 to generate a second encrypted data key 530 and stores the second encrypted data key 530 in the memory circuit 510.

The data encryption circuit 532 in the data encryption and key generation circuit 514 receives the second data block 524 associated with the client application and reads the second encrypted data key 530 from the memory circuit 510. The data encryption circuit 532 decrypts the second encrypted data key 530 based on the data key-encryption key 528 to obtain the second data key 502 and converts the second data block 524 based on the second data key 502 to obtain a second converted data block 524.

FIGS. 6A and 6B are a flow chart of a method 600 in the processor-based system 100 in FIGS. 1-3. The method 600 includes executing, in at least one processor circuit 110(1)-110(P), instructions of a first client application 202 (block 602), generating, in a secure processor circuit 116, a secure key-encryption key AKEK and a data key-encryption key DKEK in a secure processor circuit (block 604), and providing, by the secure processor circuit 116, the secure key-encryption key AKEK and the data key-encryption key DKEK to a data encryption and key generation circuit 102 on a secure interface 118 (block 606). The method 600 also includes obtaining a first client key AEK associated with the first client application 202 in the secure processor circuit 116 (block 608), encrypting, in the secure processor circuit 116, the first client key AEK based on the secure key-encryption key AKEK to generate a first encrypted client key ECK (block 610), and storing, by the secure processor circuit 116, the first encrypted client key ECK in a memory 120 accessible to the at least one processor circuit 110(1)-110(P) (block 612). The method 600 further includes reading, by the data encryption and key generation circuit 116, the first encrypted client key ECK from the memory 120 (block 614), decrypting, by the data encryption and key generation circuit 102, the first encrypted client key ECK based on the secure key-encryption key AKEK to obtain the first client key AEK (block 616), and generating, by the data encryption and key generation circuit 116, a first data key DEK based on the first client key AEK (block 618). The method 600 still further includes encrypting the first data key DEK based on the data key-encryption key DKEK to generate a first encrypted data key EDK (block 620) and storing the first encrypted data key EDK in the memory 120 (block 622).

FIG. 7 is a block diagram of an exemplary processor-based system 700 that includes a processor 702 (e.g., a microprocessor), including an instruction processing circuit 704. The processor-based system 700 may be the processor-based system 100 in FIG. 1, including the data encryption and key generation circuit 102. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 700 includes the processor 702. The processor 702 represents one or more general-purpose processing circuits, such as a microprocessor, central processing unit, or the like. More particularly, the processor 702 may be an EDGE instruction set microprocessor or other processor implementing an instruction set that supports explicit consumer naming for communicating produced values resulting from the execution of producer instructions. The processor-based system 700 may include a cloaking circuit 705 coupled to an electrical terminal of the processor 702 in an effort to reduce or prevent breaches of data security of the processor-based system 700.

The processor 702 is configured to execute processing logic in instructions for performing the operations and steps discussed herein. In this example, the processor 702 includes an instruction cache 706 for temporary, fast access memory storage of instructions accessible by the instruction processing circuit 704. Fetched or prefetched instructions from a memory, such as a main memory 708, over a system bus 710, are stored in the instruction cache 706. Data may be stored in a cache memory 712 coupled to the system bus 710 for low-latency access by the processor 702. The instruction processing circuit 704 is configured to process instructions fetched into the instruction cache 706 and process the instructions for execution. In some examples, the cloaking circuit 705 may additionally or alternatively be coupled to an electrical terminal of the system bus 710.

The processor 702 and the main memory 708 are coupled to the system bus 710 and can intercouple peripheral devices included in the processor-based system 700. As is well known, the processor 702 communicates with these other devices by exchanging address, control, and data information over the system bus 710. For example, the processor 702 can communicate bus transaction requests to a memory controller 714 in the main memory 708 as an example of a slave device. Although not illustrated in FIG. 7, multiple system buses 710 could be provided, wherein each system bus 710 constitutes a different fabric. In this example, the memory controller 714 is configured to provide memory access requests to a memory array 716 in the main memory 708. The memory array 716 is comprised of an array of storage bit cells for storing data. The main memory 708 may be a read-only memory (ROM), flash memory, dynamic random-access memory (DRAM), such as synchronous DRAM (SDRAM), etc. and/or static memory (e.g., flash memory, SRAM, etc.), as non-limiting examples.

Other devices can be connected to the system bus 710. As illustrated in FIG. 7, these devices can include the main memory 708, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow an exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 710 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 to be executed by the processor 702 for any application desired according to the instructions. The instructions 730 may be stored in the main memory 708, the processor 702, and/or the instruction cache 706 as examples of a non-transitory computer-readable medium 732. The instructions 730 may also reside, completely or at least partially, within the main memory 708 and/or within the processor 702 during their execution. The instructions 730 may further be transmitted or received over the network 726 via the modem 722, such that the network 726 includes the computer-readable medium 732. The processor-based system 700 may include a data encryption and key generation circuit 734 that may be the data encryption and key generation circuit 102 in FIG. 1 or the data encryption and key generation circuit 200 in FIG. 2.

While the computer-readable medium 732 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or a computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips that may be referenced throughout the above description may be represented by voltages, currents, electromagnetic waves, magnetic fields, optical fields, or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A processor-based system, comprising:
   at least one processor circuit configured to execute instructions of a first client application;
   a data encryption and key generation circuit comprising a data key generation circuit;
   a secure processor circuit; and
   a secure interface coupling the secure processor circuit to the data encryption and key generation circuit,
   wherein:
   the secure processor circuit is configured to:
   generate a secure key-encryption key and a data key-encryption key;
   provide the secure key-encryption key to the data encryption and key generation circuit on the secure interface;

obtain a first client key associated with the first client application;

encrypt the first client key based on the secure key-encryption key to generate a first encrypted client key; and store the first encrypted client key in a memory accessible to the at least one processor circuit; and the data key generation circuit is configured to:
read the first encrypted client key from the memory;
decrypt the first encrypted client key based on the secure key-encryption key to obtain the first client key;
generate a first data key based on the first client key;
encrypt the first data key based on the data key-encryption key to generate a first encrypted data key; and
store the first encrypted data key in the memory.

2. The processor-based system of claim 1, wherein the secure processor circuit is further configured to:
provide a public key to the first client application;
receive a second encrypted client key; and
decrypt the second encrypted client key based on the public key to obtain the first client key.

3. The processor-based system of claim 1, wherein:
the data encryption and key generation circuit further comprises a data encryption circuit;
the secure processor circuit is further configured to provide the data key-encryption key to the data encryption and key generation circuit; and
the data encryption circuit is configured to:
receive a first data block associated with the first client application;
read the first encrypted data key from the memory;
decrypt the first encrypted data key based on the data key-encryption key to obtain the first data key; and
convert the first data block based on the first data key to obtain a converted data block.

4. The processor-based system of claim 3, wherein converting the first data block comprises decrypting the first data block based on the first data key to obtain the converted data block.

5. The processor-based system of claim 4, wherein:
the first data block is received on an external interface; and
the converted data block is stored in the memory.

6. The processor-based system of claim 3, wherein converting the first data block comprises converting the first data block comprises encrypting the first data block based on the first data key to generate the converted data block.

7. The processor-based system of claim 6, wherein:
the first data block is received from the memory; and
the converted data block is transmitted on an external interface.

8. The processor-based system of claim 3, further comprising:
a system interface coupling to the secure processor circuit, the data key generation circuit, and the data encryption circuit to the memory,
wherein:
the secure processor circuit is configured to transmit, by way of the secure interface, the secure key-encryption key and the data key-encryption key to the data key generation circuit; and
the secure processor circuit is configured to transmit, by way of the system interface, the data key-encryption key to the memory.

9. The processor-based system of claim 3, wherein:
the data key generation circuit is further configured to:
generate a second data key based on the first client key;
encrypt the second data key based on the data key-encryption key to generate a second encrypted data key; and
store the second encrypted data key in the memory.

10. The processor-based system of claim 9, wherein:
the data encryption circuit is further configured to:
receive a third data block associated with the first client application;
read the second encrypted data key from the memory;
decrypt the second encrypted data key based on the data key-encryption key to obtain the second data key; and
convert the third data block based on the second data key to obtain a fourth data block.

11. The processor-based system of claim 1, wherein:
the processor-based system is disposed on an integrated circuit (IC); and
the memory is external to the IC.

12. The processor-based system of claim 1, wherein:
the processor-based system is disposed on an integrated circuit (IC); and
the memory is on-chip memory on the IC.

13. A method in a processor-based system, the method comprising:
executing, in at least one processor circuit, instructions of a first client application;
generating, in a secure processor circuit, a secure key-encryption key and a data key-encryption key;
providing, by the secure processor circuit, the secure key-encryption key and the data key-encryption key to a data encryption and key generation circuit on a secure interface;
obtaining a first client key associated with the first client application in the secure processor circuit;
encrypting, in the secure processor circuit, the first client key based on the secure key-encryption key to generate a first encrypted client key;
storing, by the secure processor circuit, the first encrypted client key in a memory;
reading, by the data encryption and key generation circuit, the first encrypted client key from the memory;
decrypting, by the data encryption and key generation circuit, the first encrypted client key based on the secure key-encryption key to obtain the first client key;
generating, by the data encryption and key generation circuit, a first data key based on the first client key;
encrypting the first data key based on the data key-encryption key to generate a first encrypted data key; and
storing the first encrypted data key in a memory accessible to the at least one processor circuit.

14. The method of claim 13, wherein obtaining the first client key further comprises:
providing, by the secure processor circuit, a public key to the first client application;
receiving, in the secure processor circuit, a second encrypted client key; and
decrypting the second encrypted client key based on the public key to obtain the first client key.

15. The method of claim 13, further comprising:
receiving, in the data encryption and key generation circuit, a first data block associated with the first client application;
reading the first encrypted data key from the memory;

decrypting the first encrypted data key based on the data key-encryption key to obtain the first data key; and converting the first data block based on the first data key to obtain a second data block.

16. The method of claim 15, wherein converting the first data block further comprises encrypting the first data block based on the first data key to generate the second data block.

17. The method of claim 16, further comprising:
receiving the first data block from the memory; and
transmitting the second data block on an external interface.

18. The method of claim 16, wherein converting the first data block further comprises decrypting the first data block based on the first data key to generate the second data block.

19. The method of claim 16, wherein converting the first data block further comprises:
receiving the first data block from an external interface; and
storing the second data block in the memory.

20. The method of claim 15, further comprising, in the data encryption and key generation circuit:
receiving a plurality of client data blocks associated with the first client application; and
for each of the client data blocks:
generating a second data key based on the first client key;
encrypting the second data key based on the data key-encryption key to generate a second encrypted data key;
storing the second encrypted data key in the memory;
reading the second encrypted data key from the memory;
decrypting the second encrypted data key based on the data key-encryption key to obtain the second data key;
encrypting the client data block based on the second encrypted data key to obtain an encrypted client data block; and
transmitting the encrypted client data block on an external interface.

21. A system comprising:
a memory circuit; and
an integrated circuit (IC) comprising:
a processor-based system comprising:
at least one processor circuit configured to execute instructions of a first client application;
a data encryption and key generation circuit comprising a data key generation circuit;
a secure processor circuit; and
a secure interface coupling the secure processor circuit to the data encryption and key generation circuit,
wherein:
the secure processor circuit is configured to:
generate a secure key-encryption key and a data key-encryption key;
provide the secure key-encryption key to the data encryption and key generation circuit on the secure interface;
obtain a first client key associated with a first client application;
encrypt the first client key based on the secure key-encryption key to generate a first encrypted client key; and
store the first encrypted client key in a memory accessible to the at least one processor circuit; and
the data key generation circuit is configured to:
read the first encrypted client key from the memory;
decrypt the first encrypted client key based on the secure key-encryption key to obtain the first client key;
generate a first data key based on the first client key;
encrypt the first data key based on the data key-encryption key to generate a first encrypted data key; and
store the first encrypted data key in the memory.

* * * * *